(12) United States Patent
Turner et al.

(10) Patent No.: US 8,578,724 B2
(45) Date of Patent: Nov. 12, 2013

(54) HEAT PUMP AND METHOD OF OPERATION

(75) Inventors: Lynn A. Turner, Avon, IN (US); Don A. Schuster, Lindale, TX (US)

(73) Assignee: Carrier Corporation, Farmington, CT (US)

( * ) Notice: Subject to any disclaimer, the term of this patent is extended or adjusted under 35 U.S.C. 154(b) by 239 days.

(21) Appl. No.: 13/254,350

(22) PCT Filed: Mar. 3, 2010

(86) PCT No.: PCT/US2010/026010
§ 371 (c)(1),
(2), (4) Date: Sep. 1, 2011

(87) PCT Pub. No.: WO2010/104709
PCT Pub. Date: Sep. 16, 2010

(65) Prior Publication Data
US 2011/0314841 A1    Dec. 29, 2011

Related U.S. Application Data

(60) Provisional application No. 61/159,869, filed on Mar. 13, 2009.

(51) Int. Cl.
*F25B 1/00* (2006.01)
(52) U.S. Cl.
USPC ............................................. 62/115; 62/222
(58) Field of Classification Search
USPC .................. 62/56, 115, 222, 223, 160, 238.7, 62/324.1, 126, 157; 700/282, 299; 137/624.11, 624.12
See application file for complete search history.

(56) References Cited

U.S. PATENT DOCUMENTS

| 4,375,753 A | * | 3/1983 | Imasu et al. ..................... 62/160 |
| 4,523,436 A | | 6/1985 | Schedel et al. |
| 4,576,011 A | * | 3/1986 | Glamm et al. .................. 62/115 |

(Continued)

FOREIGN PATENT DOCUMENTS

| JP | 11083207 | 3/1999 |
| JP | 2000274786 | 10/2000 |

(Continued)

OTHER PUBLICATIONS

International Search Report dated Sep. 28, 2010 for International Application No. PCT/US2010/026010; International Filing Date Mar. 3, 2010.

(Continued)

*Primary Examiner* — Mohammad M Ali
(74) *Attorney, Agent, or Firm* — Cantor Colburn LLP

(57) ABSTRACT

A heat pump is provided having a first heat exchanger and a second heat exchanger. A compressor is fluidly coupled to the first heat exchanger and the second heat exchanger. A reversing valve is fluidly coupled between the first heat exchanger and the second heat exchanger. The reversing valve is adapted to flow of a refrigerant from the compressor to the first heat exchanger during heating mode and to the second heat exchanger during a cooling mode. A thermal expansion valve is positioned between the first heat exchanger and the second heat exchanger. An electronic expansion valve is positioned between the first heat exchanger and the second heat exchanger. A controller is electrically coupled to operate the electronic expansion valve between a fully open, a fully closed and a modulated position depending on the operation of the compressor.

20 Claims, 3 Drawing Sheets

(56) References Cited

U.S. PATENT DOCUMENTS

| | | | |
|---|---|---|---|
| 5,120,018 A | 6/1992 | Lamb | |
| 5,187,944 A | 2/1993 | Jarosch | |
| 5,319,943 A * | 6/1994 | Bahel et al. | 62/156 |
| 5,337,574 A * | 8/1994 | Dick | 62/89 |
| 5,499,508 A * | 3/1996 | Arai et al. | 62/114 |
| 5,904,049 A | 5/1999 | Jaster et al. | |
| 6,044,651 A * | 4/2000 | Reason et al. | 62/161 |
| 6,118,099 A * | 9/2000 | Lake et al. | 219/202 |
| 6,293,123 B1 * | 9/2001 | Iritani et al. | 62/409 |
| 6,321,548 B1 | 11/2001 | Clarke et al. | |
| 6,347,528 B1 * | 2/2002 | Iritani et al. | 62/324.6 |
| 6,481,231 B2 * | 11/2002 | Vogel et al. | 62/278 |
| 6,595,012 B2 * | 7/2003 | Rafalovich | 62/92 |
| 6,705,107 B2 | 3/2004 | Schlosser et al. | |
| 6,917,857 B2 * | 7/2005 | Rentmeester et al. | 700/282 |
| 6,931,867 B2 | 8/2005 | Healy et al. | |
| 6,990,826 B1 * | 1/2006 | Lifson et al. | 62/324.1 |
| 7,003,964 B2 | 2/2006 | Solomon | |
| 7,073,344 B2 * | 7/2006 | Luo et al. | 62/234 |
| 7,810,353 B2 * | 10/2010 | Groll et al. | 62/510 |
| 7,895,850 B2 * | 3/2011 | Kitsch | 62/176.6 |
| 8,074,459 B2 * | 12/2011 | Murakami et al. | 62/159 |
| 2006/0230770 A1 * | 10/2006 | Kitsch | 62/151 |
| 2008/0053136 A1 | 3/2008 | Pham et al. | |
| 2008/0216500 A1 | 9/2008 | Chen et al. | |
| 2009/0013702 A1 * | 1/2009 | Murakami et al. | 62/118 |

FOREIGN PATENT DOCUMENTS

| | | |
|---|---|---|
| JP | 2000314563 | 11/2000 |
| JP | 2001248931 | 9/2001 |
| JP | 3967033 | 8/2007 |

OTHER PUBLICATIONS

Written Opinion of the International Searching Authority dated Sep. 28, 2010 for International Application No. PCT/US2010/026010; International Filing Date Mar. 3, 2010.

* cited by examiner

HEAT PUMP AND METHOD OF OPERATION

BACKGROUND OF THE INVENTION

The subject matter disclosed herein relates to a heat pump and in particular to a heat pump valve arrangement that prevents migration of liquid refrigerant.

A heat pump is a device used in heating, ventilating and air conditioning (HVAC) applications. Heat pumps are desirable because the same components may be used to provide both heating and cooling operations. Typically, during cooling operations, a heat pump will include an outdoor unit having a heat exchanger (condenser) coupled to a compressor that circulates liquid refrigerant to a heat exchanger (evaporator) having an expansion valve located in an indoor unit. The evaporator absorbs heat from the area or structure and circulates gaseous refrigerant back to the condenser where heat is dissipated into the environment. This thermodynamic cycle is referred to as a vapor-compression refrigeration cycle. The heat pump also includes a reversing valve that allows the flow of refrigerant to be reversed, such that when heating operation is desired, the refrigerant absorbs heat from the environment with the outdoor unit heat exchanger and transfers the heat to the indoor unit.

In most refrigeration cycles, there is a tendency for liquid refrigerant to try to migrate through the liquid line between the indoor heat exchanger and the outdoor heat exchanger. When this occurs, some of the liquid refrigerant migrates into the compressor, settling in the oil sump located in the bottom of the compressor. When the compressor is next operated, the liquid refrigerant boils into a gaseous state and exits the compressor. Unfortunately, when this occurs the refrigerant carries a portion of the compressor oil, reducing the amount of lubricant in the compressor. It should be appreciated that the loss of lubricant may cause increased wear and be detrimental to the reliability and life of the compressor.

The refrigerant carries the compressor oil through the refrigeration system. With each cycle of the refrigerant, a portion of the oil is deposited back into the compressor. While in small refrigeration systems the removal of oil from the compressor is tolerated since a smaller system will also cycle the refrigerant through the system faster allowing the oil to return to the compressor. However, in larger systems that have larger volumes of refrigerant and longer cycles, the loss of oil from the compressor may be a cause for concern.

Heat pumps are installed and operated in many environments and applications. Due to technical, or aesthetic reasons, the outdoor and indoor units may be located some distance and elevation apart. It should be appreciated that as the length of the line set between the outdoor and indoor units increases, the volume of refrigerant in the heat pump needs to be increased. As a result, when the line set increases beyond a threshold distance, additional components need to be added to avoid migration of liquid refrigerant into the compressor. Typically, this is accomplished by adding a normally closed solenoid valve to the input line to the outdoor heat exchanger. The solenoid valve is powered by a relay that is coupled to the control for the compressor. While the solenoid valve is suitable for preventing migration of the liquid refrigerant, it is undesirable since it requires an additional step to the installation process and also uses additional electrical power reducing the efficiency of the heat pump. Further, the energy requirements of the solenoid valve may require the installer to change other components within the heat pump such as a transformer.

BRIEF DESCRIPTION OF THE INVENTION

According to one aspect of the invention, a heat pump is provided having a first heat exchanger and a second heat exchanger. A compressor is fluidly coupled to the first heat exchanger and the second heat exchanger. A reversing valve is fluidly coupled between the first heat exchanger and the second heat exchanger. An electronic expansion valve is adjacent the second heat exchanger and fluidly coupled between the first heat exchanger and the second heat exchanger. A controller is electrically coupled to the electronic expansion valve. The controller includes a processor that is responsive to executable computer instructions for configuring said electronic expansion valve to a first position when the refrigerant flows from the reversing valve to the second heat exchanger. The processor is also responsive for modulating the electronic expansion valve when the refrigerant flows from the reversing valve to the first heat exchanger. The processor is further responsive to configuring the electronic expansion valve to a second position when the compressor is not operating.

According to another aspect of the invention, a heat pump is provided having a first heat transfer unit and a second heat transfer unit. The first heat transfer unit includes a first heat exchanger with a first port and a second port. A thermal expansion valve is fluidly coupled to the second port. A first conduit is fluidly coupled the first port (36). A first conduit is fluidly coupled to the thermal expansion valve. The second heat transfer unit is distally spaced from the first heat transfer unit. The second heat transfer unit includes a second heat exchanger having a third port and a fourth port. A compressor is fluidly coupled between the first conduit and the fourth port. An electronic expansion valve is fluidly coupled to the third port and the first conduit. A controller is electrically coupled to the electronic expansion valve. The controller has a processor that is responsive to executable computer instructions for configuring the electronic expansion valve to a first position when the refrigerant flows from the compressor to the fourth port. The processor is also responsive for modulating the electronic expansion valve when the refrigerant flows from the compressor to the first port. The processor is further responsive to configuring the electronic expansion valve to a second position when the compressor is off.

According to yet another aspect of the invention, a method of controlling a heat pump is provided. The method includes the step of flowing a refrigerant from an electronic expansion valve to a thermal expansion valve during a first mode. Refrigerant flows from the thermal expansion valve to the electronic expansion valve during a second mode. The electronic expansion valve is configured to a first position during the first mode. The electronic expansion valve is modulated during the second mode. The electronic expansion valve is configured to a second position when the heat pump is not operating.

These and other advantages and features will become more apparent from the following description taken in conjunction with the drawings.

BRIEF DESCRIPTION OF THE DRAWING

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
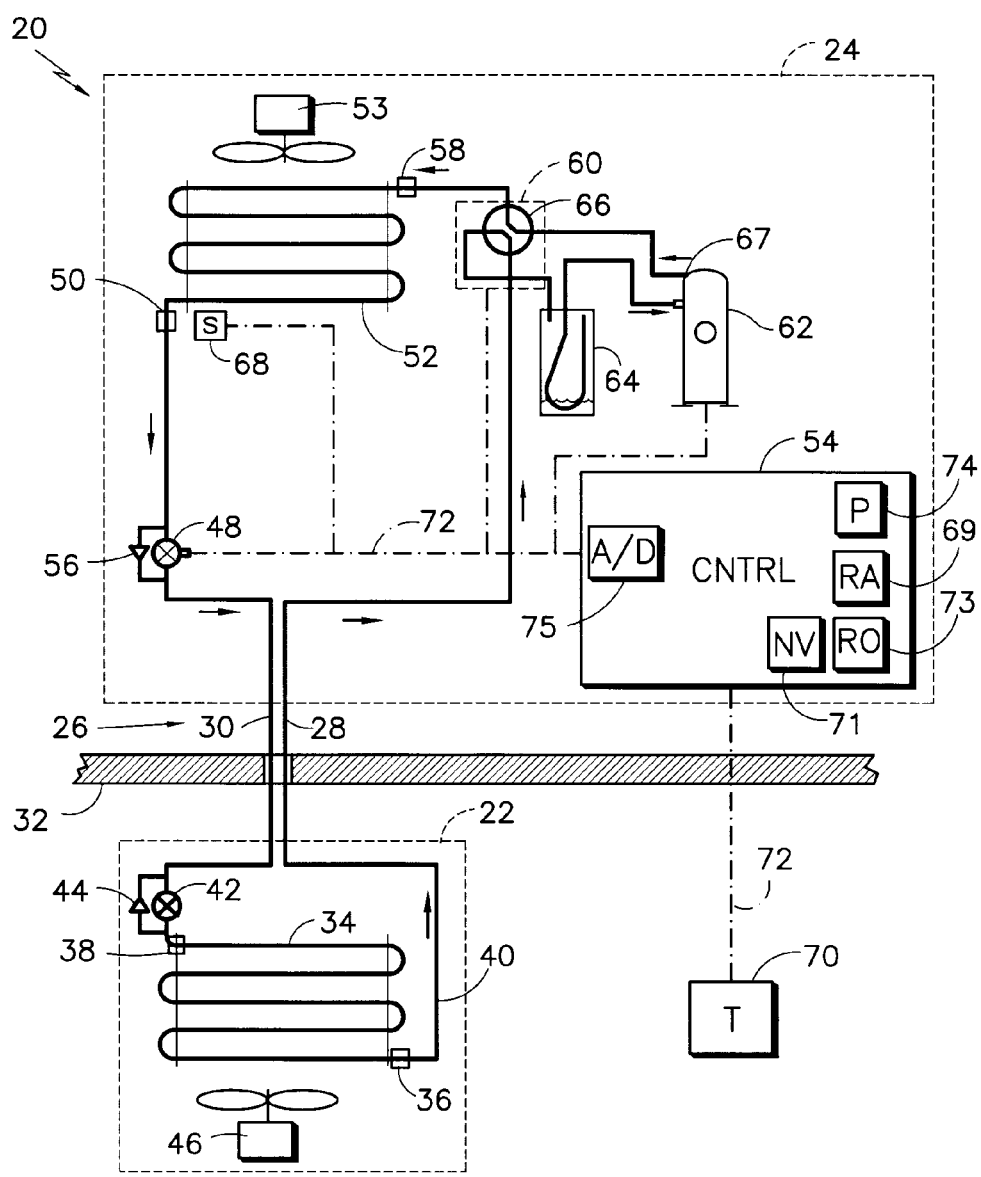
FIG. 1 is a schematic illustration of a heat pump in a cooling mode of operation in accordance with an exemplary embodiment of the invention.

Heat pumps are used in a variety of settings to provide heating and cooling to an area. Referring to FIG. 1, an exemplary heat pump 20 includes an indoor unit 22 and an outdoor unit 24. The indoor unit 22 and outdoor unit 24 are connected by a pair of conduits 26, sometimes referred to as a "line set". The line set 26 includes a first conduit 28 and a second conduit 30. Typically, the line set 26 will extend through a wall 32 of the structure that heating and cooing is being provided. When the line set becomes long, such as over 24.4 meters (80 feet), there may be a natural migration of liquid refrigerant from the indoor unit 22 to the outdoor unit 24 when the heat pump is in a standby or "off" state. An elevation difference greater than 6.1 meters (20 feet) between the outdoor unit 24 and the indoor unit 22 may also increase the migration of liquid refrigerant. As will be discussed in more detail below, the migration of the liquid refrigerant is undesirable and may adversely impact the performance, reliability and operational life of some components in the outdoor unit 24.

The indoor unit 22 includes a heat exchanger 34 having a first port 36 and a second port 38. The first port 36 fluidly coupled to a conduit 40 that connects the first port to the first conduit 28. The second port 38 is fluidly coupled to a thermostatic expansion valve 42 ("TXV"). In the exemplary embodiment, the TXV 42 is a "hard shut-off" valve that prevents flow when the valve is closed. This differs from a thermal expansion valve that is typically used in refrigeration systems that includes an orifice that allows pressures to slowly equalize on either side of the valve. The TXV 42 controls the amount of superheat entering the heat exchanger 34. This is accomplished by use of a temperature sensing bulb (not shown) filled with a similar gas as the refrigerant in the heat pump 20, which causes the valve to open against the spring pressure in the valve body as the temperature on the bulb increases. As temperatures in the heat exchanger 34 decrease so does the pressure in the bulb and therefore on the spring causing the valve to close. Opposite second port 38, the TXV 42 is fluidly coupled to the second conduit 30. In one embodiment, the TXV 42 includes an optional bypass valve 44 that allows flow of pressurized refrigerant only in one direction, from the second conduit 30 into the heat exchangers 34.

As used herein, the term "port" means a fluid connection between conduits. This connection may occur through an intermediate device such as a fitting, or alternatively, the port may be formed from the conduits themselves. Such as by flaring an end of one conduit and forming the connection by brazing or soldering the conduits together for example. As will be discussed in more detail below, the ports 36, 38 may also be described as an inlet or an outlet. However, the flow of refrigerant within the heat pump 20 may reverse direction during operation such that port 36 may be the inlet to the heat exchanger 34 during heating mode, but the outlet during cooling mode. Similarly, the function of the heat exchanger 34 may change during operation, such that it is what is typically referred to as an evaporator during cooling modes and a condenser during heating modes.

The indoor unit also includes one or more air movement devices, such as a fan 46. The fan 46 is arranged to flows air over and/or around the heat exchanger 34. This allows the transfer of thermal energy either to or from the heat exchanger to the area being heated or cooled.

The outdoor unit 24 is positioned outside the area to be heated and cooled to allow the transfer of thermal energy to and from the ambient environment. The outdoor unit 24 includes an electronic expansion valve 48 ("EXV") fluidly coupled to the second conduit 30. The EXV 48 operates in a similar manner to the TXV 42 in that it controls the amount of superheat at a third port 50 for heat exchanger 52. Unlike the TXV 42, which operates based on thermal and mechanical feedback, the EXV 48 is coupled to a controller 54, which determines the desired valve size during operation. In one embodiment, the EXV 48 includes an optional bypass valve 56 is fluidly coupled to allow pressurized refrigerant to flow from the third port 50 to the second conduit 30 while preventing flow in the opposite direction. A fan 53 moves ambient air over or past the heat exchanger 52 to either add or remove heat.

Figure 2:
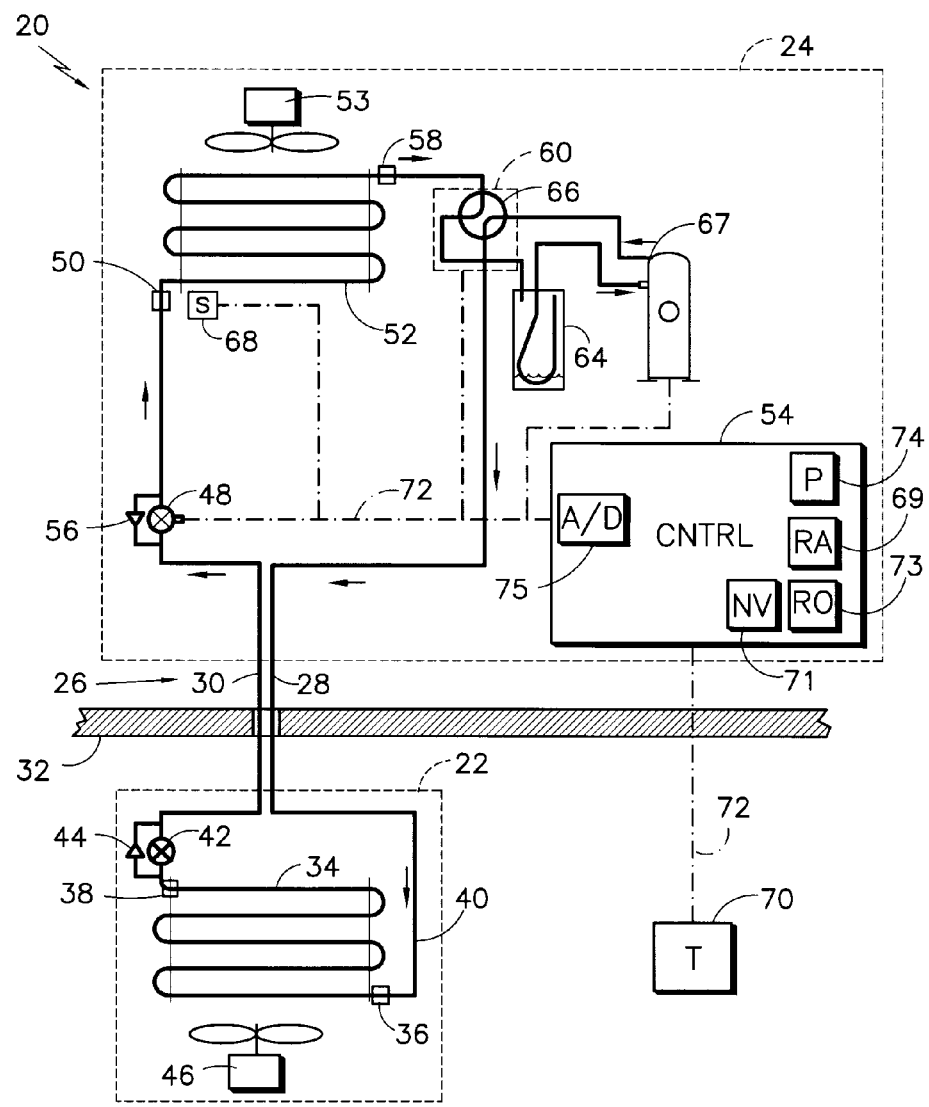
FIG. 2 is a schematic illustration, of the heat pump of FIG. 1 in a heating mode of operation; and, FIG. 3 is a flow chart illustration of a method of operating the heat pump of FIG. 1.

Opposite the third port 50, the heat exchanger 52 includes a fourth port 58 the fluidly couples the heat exchanger 52 to a reversing valve 60, sometimes referred to as a four-way valve. The reversing valve 60 allows the coupling of a compressor 62 to the heat exchangers 34, 52 to allow bi-directional flow of refrigerant between the heat exchangers 34, 52 while keeping the flow uni-directional in the compressor portion of the heat pump 20. The reversing valve 60 fluidly couples the fourth port 58, the first conduit 28, the compressor 62 and an accumulator 64. An internal body 66 rotates between a first position for cooling mode to a second position for heating mode. In the first position, the body 66 fluidly coupling the fourth port 58 to a compressor discharge outlet 67 and the first conduit 28 to the accumulator 64. When rotated to the second position, the body 66 fluidly couples the fourth port 58 to the accumulator 64, and the first conduit 28 to the compressor discharge outlet 67. Thus, by rotating the body 66, the reversing valve 60 may either direct the refrigerant discharged from the compressor 62 to either the heat exchanger 52 (cooling mode, FIG. 1) or to the first conduit 28 (heating mode, FIG. 2).

One issue that arises with heat pumps is the migration of liquid refrigerant during periods of nonuse. Under natural convection, the refrigerant will flow within the heat pump 20 and migrate to the coldest point in the system. The migration effect is generally greater in the spring and the fall when there are relatively long periods of heat pump 20 off-time and the outdoor unit 24 has soaked in an outdoor ambient colder than the indoor unit 22. In mornings, as the sun and warming ambient temperature raises the temperature of the outdoor unit 24, the relatively larger thermal mass of the compressor 62 causes the compressor 62 to be the coldest point in the heat pump 20. The refrigerant, if un-hindered, will migrate to the coldest point in the system.

The migration of liquid refrigerant into the compressor may decrease the reliability and life of the compressor. While the compressor 62 may tolerate a certain amount of migration, the magnitude of this issue increases once the line set is greater than 24.4 meters (80 feet) due to the increased volume of refrigerant in the heat pump 20. Further, an elevation difference greater than 6.1 meters (20 feet) between the outdoor unit 24 and the indoor unit 22 may also increase the migration past acceptable levels. As will be discussed in more detail below, the heat pump 20 is arranged to prevent migration from the line set 26 through the EXV 48. This arrangement is advantageous in that it allows control of the migration with the controller 54 without additional components or extra installation procedures.

The controller 54 is coupled to transmit and receive signals from the EXV 48, the compressor 62 and the reversing valve 60. The controller 54 is also coupled to a device, such as a thermostat 70, in the area being heated and cooled. The controller 54 will also be connected to sensors, such as temperature sensors and pressure sensors for example, within the outdoor unit to provide feedback for operating the heat pump 20. Accordingly, the heat pump 20 operation is controlled by controller 54. Controller 54 is a suitable electronic device capable of accepting data and instructions, executing the instructions to process the data, and presenting the results. Controller 54 may accept instructions through user interface, or through other means such as but not limited to electronic data card, voice activation means, manually-operable selection and control means, radiated wavelength and electronic or electrical transfer. Therefore, controller 54 can be a microprocessor, microcomputer, a minicomputer, an optical computer, a board computer, a complex instruction set computer, an ASIC (application specific integrated circuit), a reduced instruction set computer, an analog computer, a digital computer, a solid-state computer, a single-board computer, a buffered computer, a computer network, a desktop computer, a laptop computer, or a hybrid of any of the foregoing.

Controller 54 is capable of transforming converting the analog voltage or current level provided by sensors, such as temperature sensor 68 or thermostat 70 for example, into a digital signal indicative of a measured temperature. Alternatively, the sensors, such as temperature sensor 68 or thermostat 70 for example, may be configured to provide a digital signal to controller 54, or an analog-to-digital (A/D) converter (not shown) maybe coupled between the temperature sensor 68 and controller 54 to convert the analog signal provided by temperature sensor 68 into a digital signal for processing by controller 54. Controller 54 uses the digital signals act as input to various processes for controlling the heat pump 20. The digital signals represent one or more heat pump 20 data including but not limited to temperatures, pressures, valve 48 operational state and the like.

Controller 54 is operably coupled with one or more components of heat pump 20 by data transmission media 72. Data transmission media 72 includes, but is not limited to, single strand wiring, twisted pair wiring, coaxial cable, and fiber optic cable, or any conductor capable of carrying an electrical signal. Data transmission media 72 may also include, but is not limited to, wireless, radio and infrared signal transmission systems. In the embodiment shown in FIG. 1 and FIG. 2, transmission media 72 couples controller 54 to compressor 62, reversing valve 60, EXV 48, temperature sensor 68 and thermostat 70. Controller 54 is configured to provide operating signals to these components and to receive data from these components via data transmission media 72.

In general, controller 54 accepts data from temperature sensor 68, EXV 48, compressor 62 and thermostat 70, is given certain instructions for the purpose of comparing the data to predetermined operational parameters. Controller 54 provides operating signals to compressor 62, reversing valve 60 and EXV 48. The controller 54 compares the operational parameters to predetermined variances (e.g. low temperature, high temperature, low pressure) and if the predetermined variance is exceeded, generates a signal that may be used to indicate an alarm or may initiate other control methods that adapt the operation of the heat pump 20 such as changing the operational state of EXV 48 to compensate for the out of variance operating parameter.

As will be discussed in more detail below, controller 54 also performs control methods to prevent the migration of liquid refrigerant from the indoor unit 22 to the compressor 62 via second conduit 30. In one embodiment, the controller 54 closes the EXV 48 when the compressor 62 is not operating. The closing of the EXV 48 prevents the natural liquid migration due to the temperature difference between the indoor unit 22 and the outdoor unit 24. In the embodiment having a hard shut off TXV 42, the TXV 42 self-regulates and operates independently of the controller 54. The TXV 42 closes when a temperature change is detected due to the compressor 62 not operating. By closing the TXV 42, additional liquid refrigerant is prevented from migrating into the second conduit 30, which in turn reduces the pressure on the EXV 42. It should be appreciated that since the TXV 42 operates on a thermal and mechanical feedback, coordination of the closing of EXV 48 and the TXV 42 may be accomplished without controller 54 providing a signal to the TXV 42.

In the exemplary embodiment, the controller 54 includes a processor 74 coupled to a random access memory (RAM) device 69, a non-volatile memory (NVM) device 71, a read-only memory (ROM) device 73, and one or more input/output (I/O) controllers 75.

Figure 3:
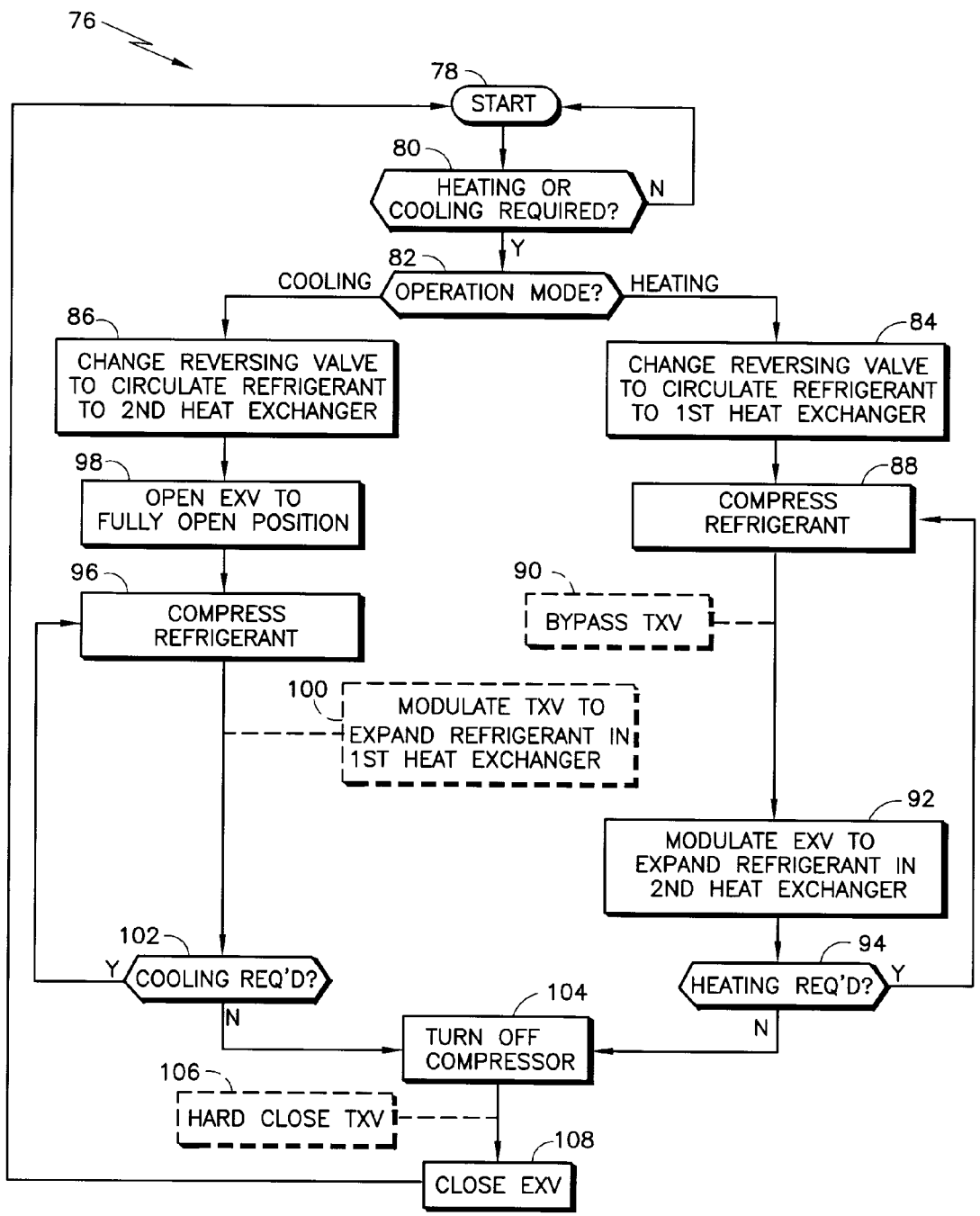

Controller 54 includes operation control methods embodied in application code, such as that shown in FIG. 3 for example. These methods are embodied in computer instructions written to be executed by processor 74, typically in the form of software. The software can be encoded in any language, including, but not limited to, assembly language, VHDL (Verilog Hardware Description Language), VHSIC HDL (Very High Speed IC Hardware Description Language), Fortran (formula translation), C, C++, Visual C++, Java, ALGOL (algorithmic language), BASIC (beginners all-purpose symbolic instruction code), visual BASIC, ActiveX, HTML (HyperText Markup Language), and any combination or derivative of at least one of the foregoing. Additionally, an operator can use an existing software application such as a spreadsheet or database and correlate various cells with the variables enumerated in the algorithms. Furthermore, the software can be independent of other software or dependent upon other software, such as in the form of integrated software.

Referring now to FIG. 3, an operational method 76 for heat pump 20 is described. The method 76 starts in block 78 and proceeds to query block 80 where it is determined whether heating or cooling is required. This determination may be based on a signal from thermostat 70 for example. If the query block 80 returns a negative, the method 76 loops back to start block 78. If query block 80 returns a positive, indicating that heating or cooling is desired, the method 76 proceeds to query block 82. It should be appreciated that the temperature levels that indicate the desire for additional heating or cooling may include a degree of hysteresis, such that the query block 80 may return a positive value when temperature measured by thermostat 70 is offset from the desired temperature. Query block 82 determines which operational mode is required, for example, if the thermostat 70 indicates that the temperature of the area is below a desired level, the query block 82 returns a "heating" valve and method 76 proceeds to block 84. If the temperature of the area is above a desired level, the query block 82 returns a "cooling" value and the method 76 proceeds to block 86.

If the query block 82 indicates that additional heating is required, the method 76 proceeds to block 84 where the reversing valve 60 is actuated to orient the body 66 to direct refrigerant from the compressor discharge outlet 67 into the first conduit 28. The method 76 then activates the compressor 62 in block 88 causing warm high-pressure refrigerant to flow into the heat exchanger 34. The refrigerant releases thermal energy into the area being heated. The cooling of the refrigerant causes the refrigerant to condense and exit the heat exchanger 34. In one embodiment, the TXV 42 is arranged to be fully open during a heating mode of operation allowing the condensed refrigerant to flow into the second conduit 30 in block 90. As discussed above, the TXV 42 self-regulates and operates independently based on the temperature detected by the TXV 42. Alternatively, the heat pump 20 may be configured with the bypass valve 44, which allows the TXV 42 to remain closed while still enabling the pressurized flow of refrigerant into the second conduit 30. It should be appreciated that the bypass valve 44 is arranged to open at a pressure level when the compressor 62 is operating such that the bypass valve 44 is closed when the compressor is in a standby or off operating state.

The condensed refrigerant flows through second conduit 30 to the EXV 48. The method 76 modulates the valve opening of EXV 48 in block 92 to maintain a desired level of superheat. As the condensed refrigerant flows through the EXV 48, the refrigerant experiences a pressure drop that causes the refrigerant to return to a gaseous state. The refrigerant then flows through the heat exchanger 52 absorbing heat from the ambient environment before being transferred to the accumulator 64. The method 76 then proceeds to query block 94 where it is determined if heating is still needed. If query block 94 returns a positive, the process 76 loops back to block 88 and the heating mode of operation continues until the desired temperature has been achieved.

If query block 82 returns a "cooling" value, the process 76 proceeds to block 86 where the reversing valve 60 is actuated to orient the body 66 to direct refrigerant from the compressor discharge outlet 67 into the heat exchanger 52. In the exemplary embodiment, the method 76 opens the EXV 48 to a fully open position in block 98. Alternatively, the EXV 48 may remain closed and the bypass valve 56 may be used to allow the condensed refrigerant to flow into second conduit 30. The bypass valve 56 is arranged to allow flow of refrigerant from the heat exchanger 52 and prevent flow in the reverse direction. The bypass valve 56 is further configured to open when the compressor 62 pressurizes the condensed refrigerant. The method 76 then activates the compressor 62 in block 96 causing warm high-pressure refrigerant to flow into the heat exchanger 52. The refrigerant cools as it flows through the heat exchanger 52 and condenses to a liquid state.

The condensed refrigerant flows through the second conduit to the TXV 42. The valve opening TXV 42 is modulated in block 100 to maintain a desired level of superheat. As discussed above, the TXV 42 modulates and self-regulates in response to the temperature detected by TXV 42. As the condensed refrigerant passes through the TXV 42, the refrigerant returns to a gaseous state. As the refrigerant passes through the heat exchanger 34, the refrigerant absorbs heat before flowing into first conduit 28 and back to accumulator 64. The method 76 then proceeds to query block 102 where it is determined if cooling is still required. If query block 102 returns a positive, the method 76 loops back to block 96 and the cooling mode of operation continues until the desired temperature has been achieved.

Once query block 94 or query block 102 return a negative, the method 76 proceeds to block 104 where the compressor is turned off In one embodiment, the TXV 42 closes due to the change in temperature in block 106. The closing of TXV 32 prevents the flow of liquid refrigerant from the indoor unit 22 to the second conduit 30. The method 76 then proceeds to block 108 where the EXV 48 is closed, preventing liquid refrigerant from flowing from the second conduit 30 into the outdoor unit 24. The method 76 then loops back to start block 78 and the method 76 begins again.

As disclosed, some embodiments of the invention may include some of the following advantages: an ability to prevent the migration of liquid refrigerant into the compressor during periods of nonuse; the ability to prevent migration of liquid refrigerant with a single valve; the ability to prevent the migration of liquid refrigerant with a controller in an outdoor unit; and increasing the operational life and the reliability of the compressor.

An embodiment of the invention may be embodied in the form of processor-implemented processes and apparatuses for practicing those processes. Embodiments of the present invention may also be embodied in the form of a processor program product having program code containing instructions embodied in tangible media, such as floppy diskettes, CD-ROMs, hard drives, USB (universal serial bus) drives, processor memory, or any other processor readable storage medium, wherein, when the program code is loaded into and executed by a processor, the processor is responsive to the executable instructions and becomes an apparatus for practicing the invention. Embodiments of the invention also may be embodied in the form of instructions, or program code, for example, whether stored in a storage medium, loaded into and/or executed by a processor, or transmitted over some transmission medium, such as over electrical wiring or cabling, through fiber optics, or via electromagnetic radiation, wherein when the instructions or program code are loaded into and executed by a processor, the processor becomes an apparatus for practicing the invention. When implemented on a general-purpose microprocessor, the instructions or program code segments configure the microprocessor to create specific logic circuits. A technical effect of the executable instructions is to control a heat pump system to provide heating and cooling to a desired area. A further technical effect of the executable instructions is to control valves within the heat pump system to prevent or minimize migration of refrigerant when the heat pump system is not operating.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A heat pump comprising:
a first heat exchanger;
a second heat exchanger;
a compressor fluidly coupled to said first heat exchanger and said second heat exchanger;
a reversing valve fluidly coupled between said first heat exchanger and said second heat exchanger;
an electronic expansion valve adjacent said second heat exchanger and fluidly coupled between said first heat exchanger and said second heat exchanger; and,
a controller electrically coupled to said electronic expansion valve, said controller having a processor responsive to executable computer instructions for configuring said electronic expansion valve to a first position when said refrigerant flows from said reversing valve to said second heat exchanger, said processor also being responsive for modulating said electronic expansion valve when said refrigerant flows from said reversing valve to said first heat exchanger, said processor further being responsive to configuring said electronic expansion valve to a second position when said compressor is not operating.

2. The heat pump of claim 1 further comprising a hard shut-off thermal expansion valve adjacent said first heat exchanger and fluidly coupled between said first heat exchanger and said second heat exchanger.

3. The heat pump of claim 1 wherein said first position is a fully open position.

4. The heat pump of claim 3 wherein said second position is a fully closed position.

5. The heat pump of claim 1 further comprising a first bypass valve adjacent said second heat exchanger and fluidly coupled between said second heat exchanger and said thermal expansion valve, wherein said first bypass valve is adapted to open when said refrigerant flows from said reversing valve to said second heat exchanger.

6. The heat pump of claim 5 wherein said first position and said second position is a fully closed position.

7. The heat pump of claim 6 further comprising a first bypass valve adjacent said first heat exchanger and fluidly coupled between said first heat exchanger and said electronic expansion valve.

8. The heat pump of claim 4 further comprising:
a first conduit between said compressor and said first heat exchanger; and,
a first conduit between said thermal expansion valve and said electronic expansion valve;
wherein said first conduit and said first conduit each have a length greater than 24.4 meters.

9. The heat pump of claim 8 wherein a difference in elevation between said first heat exchanger and said second heat exchanger is greater than 6.1 meters.

10. A heat pump comprising:
a first heat transfer unit comprising:
a first heat exchanger with a first port and a second port; and,
a thermal expansion valve fluidly coupled to said second port;
a first conduit fluidly coupled said first port;
a first conduit fluidly coupled to said thermal expansion valve; and,
a second heat transfer unit distally spaced from said first heat transfer unit, said second heat transfer unit comprising:
a second heat exchanger having a third port and a fourth port;
a compressor fluidly coupled between said first conduit and said fourth port;
an electronic expansion valve fluidly coupled to said third port and said first conduit; and,
a controller electrically coupled to said electronic expansion valve, said controller having a processor responsive to executable computer instructions for configuring said electronic expansion valve to a first position when said refrigerant flows from said compressor to said fourth port, said processor also being responsive for modulating said electronic expansion valve when said refrigerant flows from said compressor to said first port, said processor further being responsive to configuring said electronic expansion valve to a second position when said compressor is off.

11. The heat pump of claim 10 wherein said first position is fully closed and said second position is fully open.

12. The heat pump of claim 10 further comprising a first bypass valve fluidly coupled between said third port and said first conduit, said first bypass valve adapted to open when said refrigerant flows from said compressor to said second heat exchanger.

13. The heat pump of claim 12 wherein said first position and said second position is a fully closed position.

14. The heat pump of claim 13 further comprising a first bypass valve fluidly coupled between said first heat exchanger and said first conduit, said first bypass valve adapted to open when said refrigerant flows from said compressor to said first heat exchanger.

15. The heat pump of claim 10 wherein first heat transfer unit and said second heat transfer unit are spaced such that said first conduit and said first conduit each have a length greater than 24.4 meters.

16. The heat pump of claim 15 wherein said first heat transfer unit and said second heat transfer unit are arranged such that a difference in elevation between said second port and said third port is greater than 6.1 meters.

17. A method of controlling a heat pump comprising:
flowing a refrigerant from an electronic expansion valve to a thermal expansion valve during a first mode;
flowing a refrigerant from said thermal expansion valve to said electronic expansion valve during a second mode;
configuring said electronic expansion valve to a first position during said first mode;
modulating said electronic expansion valve during said second mode; and,
configuring said electronic expansion valve to a second position when said heat pump is not operating.

18. The method of claim 17 further comprising
bypassing said electronic expansion valve during said first mode, wherein said electronic expansion valve first position and said second position is a fully closed position.

19. The method of claim 18 further comprising bypassing said thermal expansion valve during said second mode.

20. The method of claim 19 further comprising closing said thermal expansion valve.

* * * * *